June 30, 1964 — M. RICHLER — 3,139,289
TRACTOR WITH ELEVATABLE FIFTH-WHEEL
Filed Jan. 21, 1963 — 2 Sheets-Sheet 1

INVENTOR
MAX RICHLER
ATTORNEY

June 30, 1964          M. RICHLER          3,139,289
TRACTOR WITH ELEVATABLE FIFTH-WHEEL
Filed Jan. 21, 1963          2 Sheets-Sheet 2
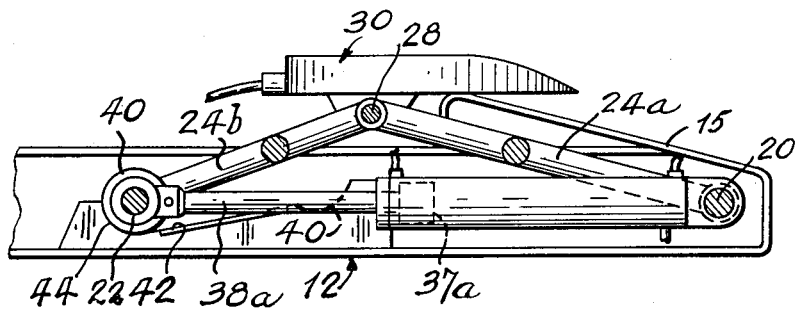
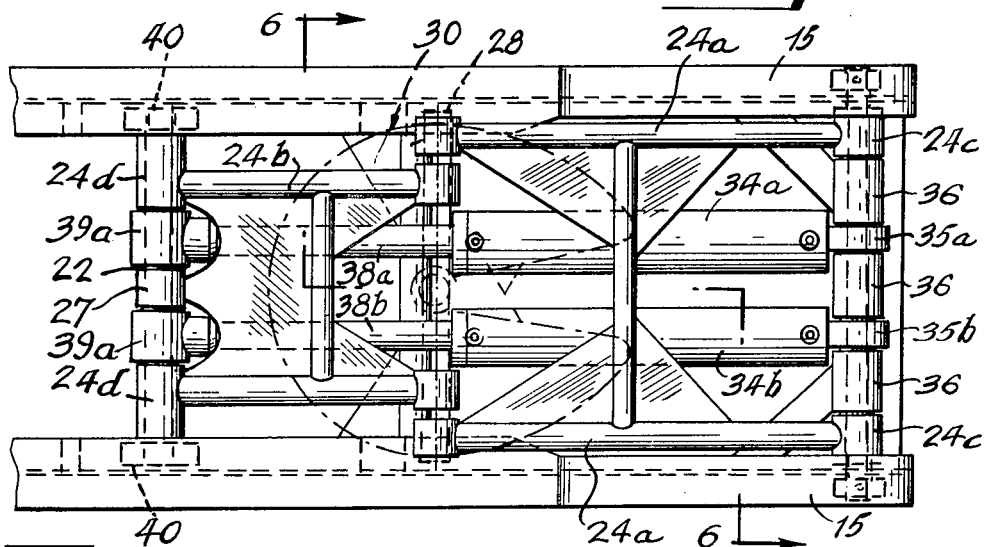
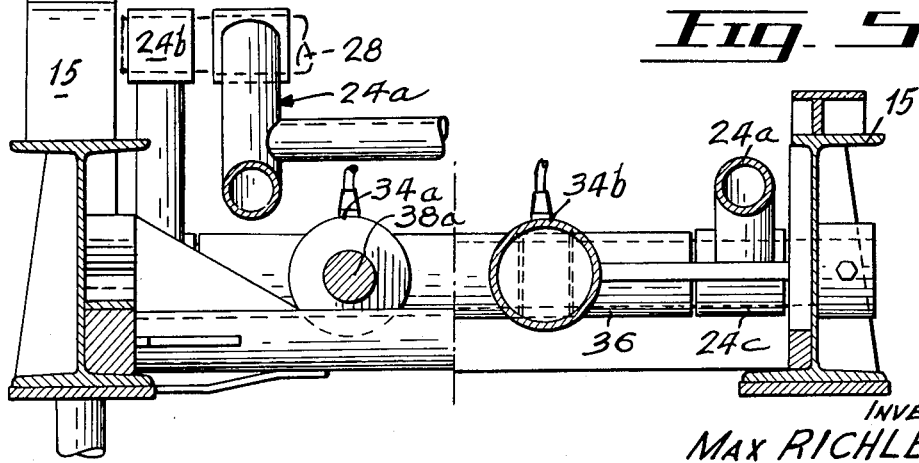
INVENTOR
MAX RICHLER
ATTORNEY

United States Patent Office 3,139,289
Patented June 30, 1964

3,139,289
TRACTOR WITH ELEVATABLE FIFTH-WHEEL
Max Richler, St. Laurent, Quebec, Canada, assignor to Atlas Hoist & Body Inc., Montreal, Quebec, Canada
Filed Jan. 21, 1963, Ser. No. 252,753
2 Claims. (Cl. 280—425)

The present invention relates to improvements in the construction of traction units for trailer trucks and more particularly to an improved trailer shunter construction designed particularly for terminal work.

With standard trailer cab units or shunters utilized in terminal shunting it requires as many as sixteen (16) shunting motions and five (5) transmission shifts to line-up, hook-on and move a trailer truck body from one location to another. In addition, raising the shunter fifth wheel assembly generally requires further shifting and/or clutching.

The present invention aims to provide an improved trailer shunter construction which embodies means whereby pick-up and release of trailer truck bodies in shunting operations is made possible with a great reduction in the usual shunting motions and shifting. This is accomplished by providing the shunter frame assembly with a fifth wheel assembly supported on linkage operated by one or more hydraulic cylinders in such a manner that the fifth wheel assembly can easily and quickly align with the trailer truck king-pin, the king-pin connection made and the trailer truck coupling end elevated clear of the usual supporting legs into hauling position. The fifth wheel assembly by this construction is raised well clear of the shunter wheels so that tight turns can be made in the shunting operations. Means are also provided whereby the weight of the fifth wheel assembly and the trailer truck body supported thereby is supported by the shunter chassis frame rather than the fifth wheel raising hydraulic cylinder or cylinders.

Having thus generally described the nature of the invention, particular reference will be made to the accompanying drawing showing by way of illustration a preferred embodiment thereof, and in which;

FIGURE 3 is an enlarged detail view in side elevation of the fifth wheel assembly as shown in FIGURE 1 as it would appear relative to the shunter frame.

FIGURE 5 is a plan view of the construction shown in FIGURE 3.

FIGURE 6 is a sectional view of FIGURE 5 along the line 6—6 to illustrate the construction more clearly.

Figure 1:
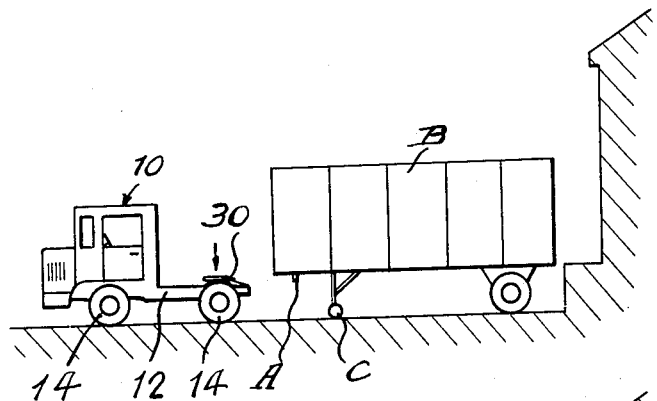
FIGURE 1 is a somewhat diagrammatic view of a trailer traction-unit or shunter as it would appear lining up with a trailer truck body with the fifth wheel assembly in retracted position.

The trailer shunter 10, to which the present improved frame and fifth wheel raising arrangment is particularly suited, consists essentially of a main supporting frame or chassis 12 on which wheels 14 are mounted. The usual driving motor, cab, transmission, driving controls and hydraulic system for operating the present fifth wheel raising mechanism and brakes are also mounted on the frame 12. Since these arrangements are known and do not form a part of the present invention it is not thought necessary to describe or illustrate them in detail.

The improved construction according to the invention includes a modified frame assembly 12 between the opposed rear end portions of which a shaft 20 is journalled.

Figure 4:
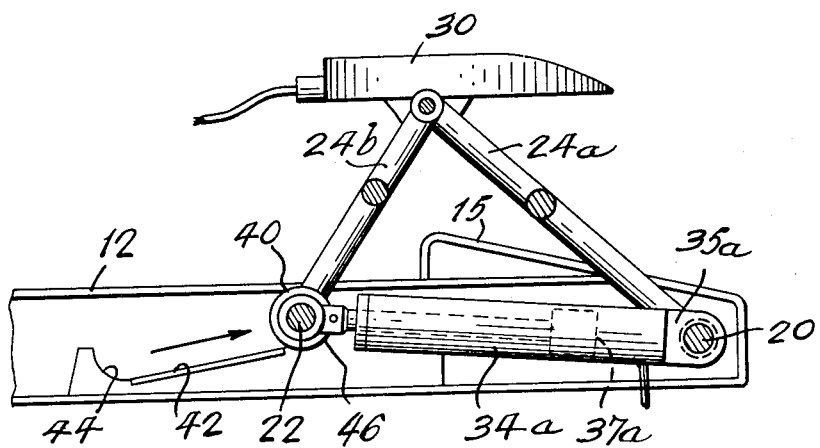
FIGURE 4 is an enlarged detail view in side elevation corresponding to FIGURE 3 with the assembly in raised position as shown in FIGURE 2.

The fifth wheel raising mechanism of the invention includes a pivotally interconnected assembly of a first tubular frame 24a and a second frame 24b, both of substantially H-shaped outline. At one end the first H frame 24a is provided with suitable bushings 24c and these are mounted on the shaft 20, as shown most clearly in FIGURE 3. One end of the second H frame 24b is provided with bushings 24d and these are mounted for pivotal movement on shafts 22 extending from each side of a tubular piston shaft engaging portion 27. The other ends of the H frames 24a, 24b are pivotally connected to each other by a shaft 28 which also acts as the main supporting member for a fifth wheel assembly 30, as shown most clearly in FIGURES 4 and 5. The fifth wheel assembly 30 is a known mechanically operated type adapted, when the assembly is aligned and backed up under a trailer unit, to engage and couple with the trailer king-pin.

In the preferred construction shown, a pair of hydraulic cylinders 34a, 34b are provided with end bearings 35a, 35b which are also journalled on the shaft 20 with bushings 36 provided between the cylinder bearings 35a, 35b and the H frame bushings 24c. The respective pistons 37a, 37b are provided with piston shafts 38a, 38b having end bearings 39a, 39b also journalled on the shafts 22 of the piston shaft engaging assembly 27. Suitable hydraulic connections are provided between the front and rear ends of the cylinders 34a, 34b and the hydraulic system of the shunter. Guiding and supporting wheels 40 are mounted on the outer ends of the shafts 22 and these wheels rest on inclined ramps 42 provided at each side of the frame assembly 14. As is shown most clearly in FIGURES 3 and 4, the ramps 42 are contoured at each end so as to provide arcuate shaped wheel engaging portions 44, 46 so that further movement of the wheels 40 at the end of their travel in either direction is prevented. Further, as the wheels 40 rest and are retained securely within the wheel engaging portions 44, 46 the weight of the fifth wheel assembly 30 is supported by the frame, in the idle or unloaded position shown in FIGURE 3, and when the assembly is in the full up or loaded position shown in FIGURE 4 the additional weight of the trailer is also carried by the frame and not the hydraulic cylinders 34a, 34b.

It will also be noted that the rear ends 15 of the frame assembly 14 follow a ramp-like contour as does the loading edge of the fifth wheel assembly 30 to facilitate engagement with the front end of the trailer to be shunted.

Figure 2:
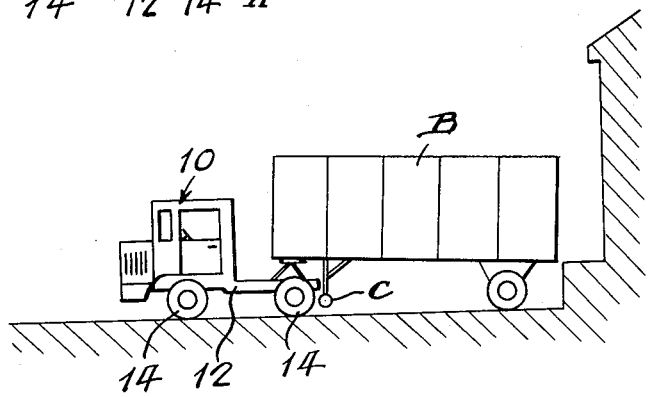
FIGURE 2 is a view corresponding to FIGURE 1 with the shunter backed into king-pin engaging position and with the fifth wheel assembly raised.

With this arrangement, the shunter 10 is backed up into alignment with the king-pin "A" of the trailer unit "B." Upon engagement of the fifth wheel assembly 30 with the kin-pin "A" the cylinders 34a, 34b are operated so that the wheels 40 lift out of the first retaining portions 44 and proceed up the ramps 42 until they drop into the second retaining portion 46. With this movement the rear of the trailer unit "B" is elevated, as shown in FIGURE 2 so that the supporting leg "C" is clear of the ground and the load can be hauled away after making the usual air connections. Reversing the preceding operations quickly releases the shunter unit for further operations.

I claim:

1. A fifth wheel elevating apparatus for a tractor unit adapted for use in combination with trailer truck bodies, comprising a foldable supporting frame mounted on the chassis frame of said unit and a fifth wheel assembly mounted on said supporting frame at the folding point of said frame, said supporting frame including first and second tubular supporting strut assemblies of susbtantially H-shaped formation with the terminal ends of the legs of each formation provided with shaft engaging bearing collars, the said bearing collars on one end of said first strut assembly being mounted on a main supporting shaft journalled on and extending transversely across one end of said chassis frame, at least one hydraulic cylinder-piston assembly pivotally connected at one cylinder end to said main supporting shaft in alignment with said first H-strut assembly bearing collar ends, the beairng collars of said first H-strut assembly other end and the corresponding bearing collars on one end of said second H-strut assembly being pivotally interconnected by a further shaft also serving as a pivotal connection for said fifth wheel assembly, the piston shaft of said hydraulic cylinder assembly being connected to a shaft bearing assembly including outstanding shaft portions at each side, said second H-strut assembly being pivotally connected to said outstanding shaft portions by said bearing collars at the ends of the legs remote from said pivotal connection with said first H-strut assembly, a pair of guiding rollers mounted for rotation one on each of the outer ends of said outstanding shaft portions, a pair of roller guiding ramps mounted on said chassis frame, one at each side, in spaced relationship from said main shaft, said ramps being adapted to support and guide the travel of said guiding rollers and each having a first roller receiving recess at one end and a second roller receiving recess at the other end whereby at the limits of travel of said rollers in either direction during raising or lowering movements of said interconnected H-frame assemblies under the influence of said hydraulic cylinder piston assembly the weight supported thereby is transmitted to and is supported by said ramps and chassis frame.

2. A fifth wheel elevating apparatus for a tractor unit adapted for use in combination with trailer truck bodies, comprising a foldable supporting frame mounted on the chassis frame of said unit and a fifth wheel assembly mounted on said supporting frame at the folding point of said frame, said supporting frame including first and second tubular supporting strut assemblies of substantially H-shaped formation with the terminal ends of the legs of each formation provided with shaft engaging bearing collars, the said bearing collars on one end of said first strut assembly being mounted on a main supporting shaft journalled on and extending transversely across one end of said chassis frame, a pair of hydraulic cylinder-piston assemblies each pivotally connected at one cylinder end to said main supporting shaft in alignment with said first H-strut assembly bearing collar ends, the bearing collars of said first H-strut assembly other end and the corresponding bearing collars on one end of said second H-strut assembly being pivotally interconnected by a further shaft also serving as a pivotal connection for said fifth wheel assembly, the piston shafts of said hydraulic cylinder assemblies being connected to each other in parallel relationship by a shaft bearing assembly including outstanding shaft portions at each side, said second H-strut assembly being pivotally connected to said outstanding shaft portions by said bearing collars at the ends of the legs remote from said pivotal connection with said first H-strut assembly, a pair of guiding rollers mounted for rotation one on each of the outer ends of said outstanding shaft portions, a pair of roller guiding ramps mounted on said chassis frame, one at each side, in spaced relationship from said main shaft, said ramps being adapted to support and guide the travel of said guiding rollers and each having a first roller receiving recess at one end and a second roller receiving recess at the other end whereby at the limits of travel of said rollers in either direction during raising or lowering movements of said interconnected H-frame assemblies under the influence of said hydraulic cylinder piston assemblies the weight supported thereby is transmitted to and is supported by said ramps and chassis frame.

References Cited in the file of this patent

UNITED STATES PATENTS 2,953,410    Chaney _____ Sept. 20, 1960

FOREIGN PATENTS 1,235,509    France _____ May 30, 1960